April 18, 1967 M. ROSSNICK 3,315,150
WIDE RANGE VOLTAGE REGULATOR
Filed April 13, 1964
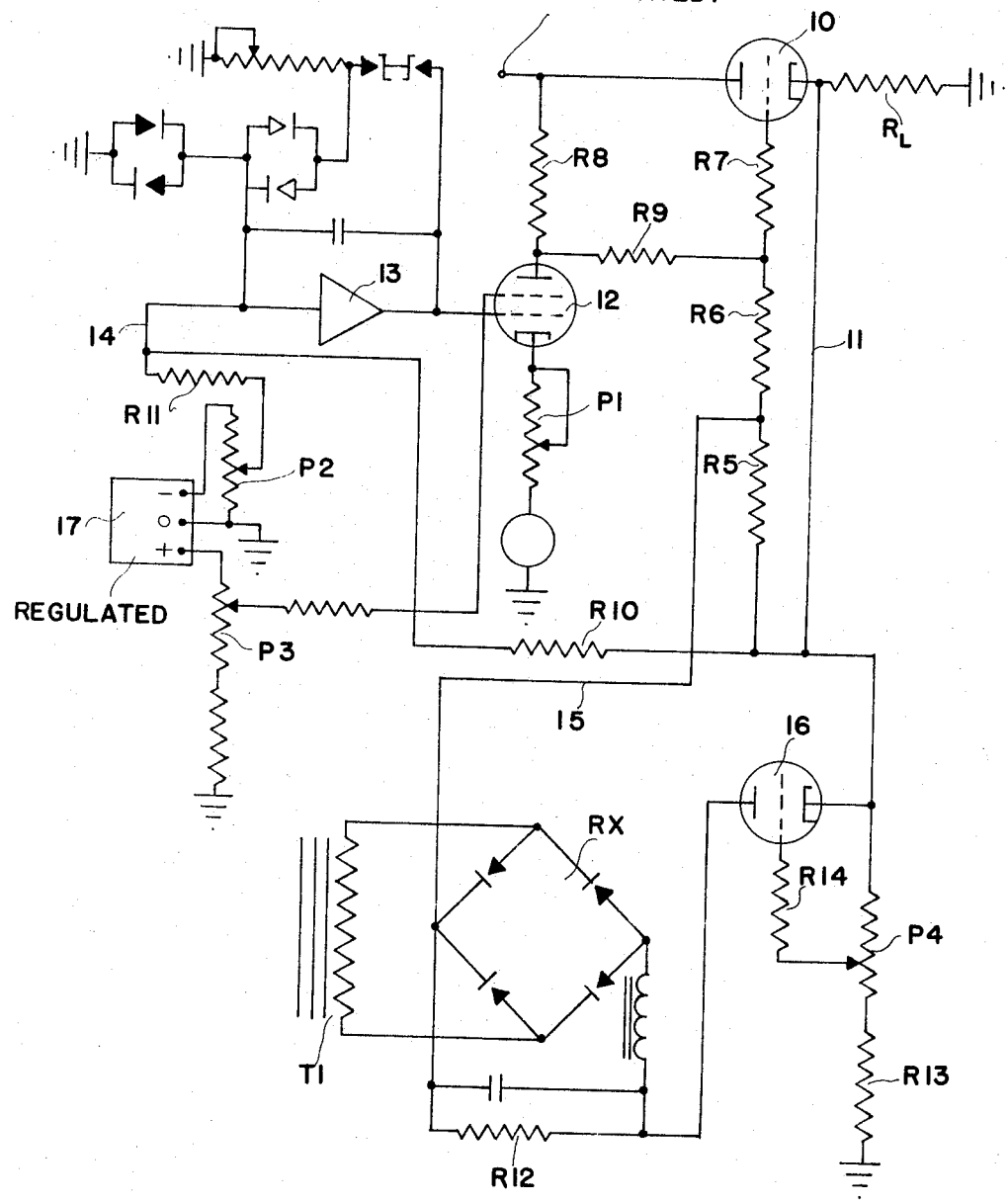
INVENTOR.
MELVIN ROSSNICK
BY
Francis J. Klempay
ATTORNEY

United States Patent Office 3,315,150
Patented Apr. 18, 1967

3,315,150
WIDE RANGE VOLTAGE REGULATOR
Melvin Rossnick, Brooklyn, N.Y., assignor, by mesne assignments, to The Taylor-Winfield Corporation, Warren, Ohio, a corporation of Ohio
Filed Apr. 13, 1964, Ser. No. 359,154
4 Claims. (Cl. 323—22)

This invention relates to an improved circuit for regulating the voltage of electrical power supplied to a load and is characterized by its ability to operate in a substantially instantaneous manner over an exceedingly wide range of voltages. In the powering of hi-frequency induction heating devices, for example, high voltages of the order of 11,000 volts and power of the order of 8 amperes at this voltage is now commonplace, and heretofore no practical voltage regulating system has been proposed for this application which will give the high speed of response over the entire voltage range as is required in systems capable of precise sequential and/or electronic control such as the application of timed pulses of variable voltage to the load.

Another object of the invention is the provision of a high speed voltage regulating circuit operative for the purpose indicated above which is highly versatile in use particularly as regards its integration with instrumentation heretofore proposed for the control of hi-frequency induction heating processes such as taped heat level functions, programmed heat levels, direct temperature measurements of the work, applied current values, metallurgical changes in metals being treated, etc. Further, the invention seeks to minimize any erratic fluctuation of the wave form supplied to the load circuit, and to maintain the voltage regulation within rather precise limits even though the voltage of the power delivered by the oscillator varies over a considerable range. In actual practice, the circuit of the invention operates within a corrective factor of ten to one, the response time is within 10 milliseconds or better, and there is continuous smooth voltage output control from practically zero up to the above mentioned 11,000 volts.

All of the above objects are accomplished in accordance with the principles of the invention by employing an electronic tube powered by an insulated secondary constant voltage source to generate potentials over a wide range for superimposition on the normal control potential supplied to the control grid of a suitable electronic valve interconnected between the power source and the load. The circuitry is such that the grids of both the valve and the tube operate in their negative regions and is capable of supplying high negative grid potentials to minimize control power requirements but to nevertheless drive the regulating valve to substantially full cut-off even when the applied anode voltage is of the order of 11,000 volts.

The above and other objects and advantages of the invention will become apparent upon consideration of the following specification and the accompanying drawing wherein there is disclosed a preferred embodiment of the invention.

In the drawing, reference numeral 10 designates the main voltage regulating valve of the system which is interconnected between the unregulated power source and the load schematically represented by resistance $R_L$. The source may, of course, be the output terminal of a power oscillator, and the tube 10 is of the grid-control type as indicated. The control grid biasing circuit for valve 10 comprises a series circuit consisting of a conductor 11 and resistances R5, R6 and R7. Connected between the power source (anode of valve 10) and ground is a series circuit comprised of the resistor R8, the anode-cathode of an amplifying tube 12 and a potentiometer P1. Interconnecting the anode of tube 12 is a further resistor R9 which, as shown in the drawing, has its other terminal connected to the junction of resistances R6 and R7. It will now be obvious that the control potential applied to the grid of valve 10 through resistors R7 and R9 will be a function of the extent of conduction in amplifier 12 and the setting of potentiometer P1.

The potential applied to the control grid of amplifier 12 is furnished by the output of a linear amplifier 13 whose input signal is, in turn, furnished by a conductor 14. This signal, in the form of a potential value, is derived from the circuit comprised of the conductor 11, a resistor R10, conductor 14, resistor R11, and potentiometer P2 which is connected across a fixed negative bias of a regulated source 17. Amplifier 12 is provided with a screen grid which is adjustably biased in a positive direction by a potentiometer P3 connected to a fixed positive voltage of the regulated supply 17.

The above described circuit is more or less known and/or conventional practice in voltage regulating systems, it being obvious that a decrease in voltage at the cathode of tube 10 from the desired value as preset by the potentiometers will drive the control grid of amplifier 12 more negative to decrease conduction in the amplifier thereby driving the grid of valve 10 more positive to increase the conduction of this valve. The circuit thus far described, however, is not capable of wide range control over the conduction of the valve 10 in a high speed manner which, as explained above, is desired in the present system for pulse timing from zero to full voltage and for other purposes. This invention therefore provides for the high speed application of an additional or "floating" bias supply for the control grid circuit of the valve 10, and the same is accomplished in the following manner.

I provide a secondary power supply consisting of transformer T1, full-wave rectifier RX and associated smoothing reactance and capacitance to develop a voltage which appears across a resistor R12. This secondary supply is fully insulated and is selected as to components to operate at high voltage approaching the maximum potential of the unregulated hi-frequency power supply or at least sufficient to drive the valve 10 to cutoff in a manner to be described, taking into consideration the tendency of the amplifiers 13 and 12 to continue the valve 10 in conduction during normal regulation. The negative side of rectifier RX and resistor R12 is connected through a conductor 15 to the juncture of resistors R5 and R6 while the positive side of these components are connected to the anode of a low mu triode 16. The cathode of tube 16 is connected to the juncture of conductor 11 with resistor R5 and also to ground through potentiometer P4 and resistor R13. The movable tap of potentiometer P4 is connected through resistor R14 to the control grid of tube 16 thus providing a controllable grid bias for the tube 16—it being noted that the cathode of tube 16 is connected through conductor 11 to the positive side of the load $R_L$.

Conduction of tube 16 develops a control potential across resistor R5 in a direction applying a negative potential toward the control grid of valve 10. The grid voltage of the tube 16 is, of course, determined by the setting of potentiometer P4 and for maximum applied load voltage the grid bias on tube 16 is set at maximum in negative direction to cut off tube 16 and eliminate any effect of potential developed across resistor R5 from the gird of valve 10. When the voltage to be applied to the load is substantially zero, as at cutoff, this bias on tube 16 is removed by resetting of potentiometer P4 whereby the tube 16 becomes fully conductive to impress a very high negative voltage through resistors R6 and R7 to the grid of valve 10 to hold off this valve. Between these two extremes the setting of potentiometer P4 determines the level at which amplifiers 13, 12 and associated circuitry will operate to control the voltage applied to the load.

While the drawing indicates that the control potentiometer P4 is manually controlled it will be obvious that anyone skilled in the art can readily devise adequate and suitable electronic circuits to switch the bias on tube 16 from full-on to full-off in timed sequence as is required for the application of a timed pulse or pulses to the load, or alternatively to shift the bias on tube 16 to effect programming, substantially instantaneous control in response to metallurgical changes in the work, temperature control, overload protection, or any of the other end results mentioned in this specification. Such auxiliary control circuitry is not per se considered a part of the present invention which resides primarily in the use of the secondary power supply and the associated triode 16 for effecting very rapidly (in milliseconds) bias changes of very wide change in the main control valve 10—sufficient to drive this valve from "off" to full conduction even when dealing with power potentials of the order of 10 to 15,000 volts and higher.

It should now be apparent that I have provided an improved wide range voltage regulator which accomplishes the objects initially set out above. Not only is the control capable of exceedingly rapid response but it is effective and continuous over the maximum range of high voltage power available for the load. By proper selection of tubes for the circuitry, negligible grid power is needed for control. Logically, the operation of all tubes is in the negative grid regions of their operating characteristics. As pointed out above, and as will be apparent from a consideration that the normal or conventional regulator remains operative simultaneously with the "floating" bias applied, the line voltage regulation or correction to the load has a ratio of the order of 10 to 1—i.e., ±10% source variation may be corrected to within ±1% of the load. Also, voltage ripple at the load is also automatically and substantially reduced.

Having thus described my invention what I claim is:

1. A circuit for wide range voltage regulation comprising in combination a grid-controlled electronic valve interconnected between an unregulated source of electrical power and a load, a biasing circuit for the grid of said valve comprising a first potential generating element and means to energize said element in accordance with the load applied voltage as related to a variable regulated voltage reference whereby the load applied voltage may be regulated within a predetermined voltage span, said biasing circuit including a second voltage generating element, and means to variably energize said second element comprising a secondary voltage source and a vacuum triode in series therewith and with said second element, said secondary source and said triode being fully insulated and selected for high voltage operation whereby a negative bias of sufficient amplitude may be applied to the grid of said valve in overriding relation to the voltage developed by said first element to drive said valve to cut-off.

2. A circuit according to claim 1 further including a grid biasing circuit for said triode, and means to apply a voltage to said grid biasing circuit for said triode proportional to the load applied voltage.

3. A circuit for wide range voltage regulation comprising in combination a grid-controlled electronic valve interconnected between an unregulated source of electrical power and a load, a biasing circuit for the grid of said valve, means establishing a control voltage which is the summation of the load applied voltage and a regulated reference voltage, an amplifier for impressing on said grid biasing circuit a biasing potential which is proportional to said control voltage, a secondary voltage source and a triode in series therewith for impressing a floating bias voltage of widely ranging values on said biasing circuit, and said secondary source and said triode being fully insulated and selected for high voltage operation whereby a negative bias of sufficient amplitude may be applied to the grid of said valve in overriding relation to the voltage developed by said amplifier to drive said valve to cut-off.

4. Apparatus according to claim 3 further including a grid biasing circuit for said triode, and means to impress on said last named grid biasing circuit a potential which is proportional to said load applied voltage.

No references cited.

JOHN F. COUCH, *Primary Examiner.*

K. D. MOORE, *Assistant Examiner.*